C. K. SALISBURY.
SEPARATOR SPINDLE DRIVING CONNECTION.
APPLICATION FILED OCT. 28, 1911.
1,201,636. Patented Oct. 17, 1916.
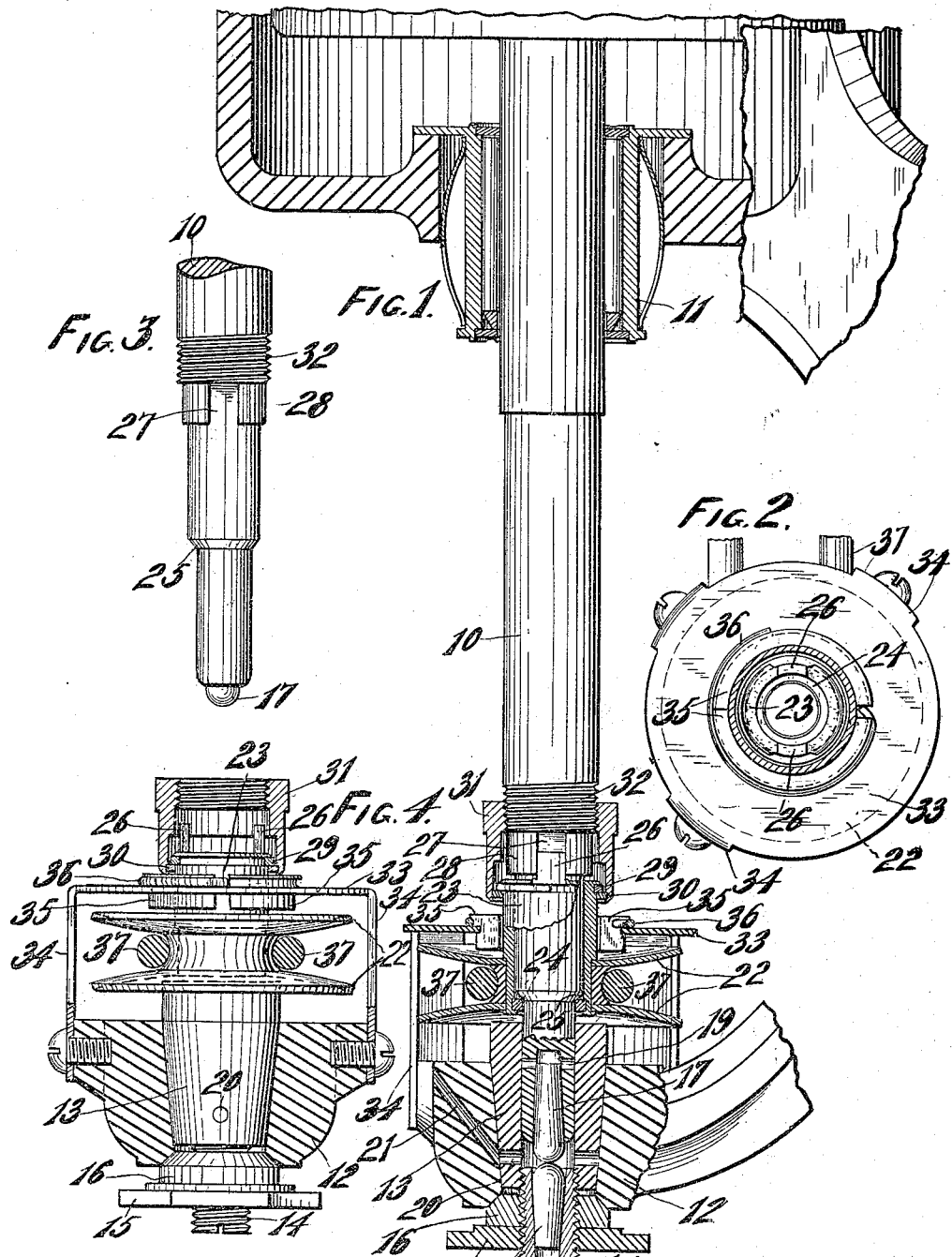
WITNESSES.
INVENTOR
Charles K. Salisbury
By Morrell and Caldwell
ATTORNEYS

UNITED STATES PATENT OFFICE.

CHARLES K. SALISBURY, OF MILWAUKEE, WISCONSIN, ASSIGNOR TO STANDARD SEPARATOR COMPANY, OF MILWAUKEE, WISCONSIN, A CORPORATION OF NEW JERSEY.

SEPARATOR-SPINDLE-DRIVING CONNECTION.

1,201,636.　　　　　Specification of Letters Patent.　　Patented Oct. 17, 1916.

Application filed October 28, 1911.　Serial No. 657,368.

*To all whom it may concern:*

Be it known that I, CHARLES K. SALISBURY, a citizen of the United States, and resident of Milwaukee, in the county of Milwaukee and State of Wisconsin, have invented new and useful Improvements in Separator-Spindle-Driving Connections, of which the following is a description, reference being had to the accompanying drawings, which are a part of this specification.

This invention relates to driving connection for spindles of centrifugal separators and has for its object to provide for driving the spindle by means of a gas engine or the like with a belt driving connection which will be undisturbed when the separator bowl is removed, the spindle of the bowl having a detachable connection with the belt pulley of the driving connection.

Another object of the invention is to simplify the mechanical construction of such a detachable driving connection whereby it may be made inexpensive to manufacture and durable in use.

With the above and other objects in view, the invention consists in the separator spindle driving connection, as herein claimed, and all equivalents.

Referring to the accompanying drawing in which like characters of reference indicate the same parts in different views: Figure 1 is a sectional elevation of a separator spindle driving connection constructed in accordance with this invention; Fig. 2 is a plan view of the pulley casing and connecting sleeve with the nut sectioned; Fig. 3 is a detail view of the lower end of the spindle; and Fig. 4 is a sectional detail view of the driving pulley and its parts adapted for connection with the spindle.

In these drawings 10 indicates the spindle of a centrifugal separator bowl which is supported in an upper yielding bearing 11, as usual, and at its lower end rests on a pin bearing which will be described more in detail. The supporting frame 12 has a conical recess containing a correspondingly shaped bushing 13 with a central bore to receive the reduced end of the separator spindle. This bushing 13 is held firmly in place by a screw plug 14 threading into its lower end and having a nut 15 threaded thereon with a leather gasket 16 between the nut and the frame 12, the turning of the nut 15 on the screw plug 14 serving to force the gasket 16 into the opening of the frame and draw the bushing 13 downwardly. The screw plug 14 has a tapering recess in its upper end and the spindle 10 has a corresponding tapering recess in its lower end and in these recesses are mounted tapering bearing pins 17 with rounded or hemispherical engaging ends, the screw plug 14 having a central opening 18 and the spindle having a transverse opening 19 through which the bearing pins may be engaged to release them when they become worn and it is desired to replace them. The bushing 13 has a lubricant opening 20 which is fed with oil through an inclined duct 21 in the frame 12 for admitting a lubricant to the lower or step bearing of the spindle.

Inasmuch as the spindle of the separator is desired to be directly driven from a gasolene engine or the like instead of having a high speed worm driving gear from a crank handle, as usual, a belt pulley 22 mounted on a coupling sleeve 23 is provided to fit upon the spindle. Said sleeve 23 has an inwardly extending flange 24 engaging a shoulder 25 of the spindle and also has a pair of upwardly extending key lugs 26 which fit corresponding recesses or keyseats 27 in the next larger portion 28 of the spindle. The sleeve 23 has an outwardly extending flange 29 at its upper end which engages an inwardly extending flange 30 of a clamping nut 31 which surrounds the sleeve and threads on the next larger portion 32 of the spindle. By turning the nut 31 on the screw threads 32 of the spindle the sleeve 23 is drawn upwardly on the spindle to clamp it in its coupled position thereon with the key lugs 26 fitting in the recesses 27. The flanges 24, 29 and 30 are formed by rings fitted within or upon the parts, as the case may be, and against a shoulder thereof and held in place by having the end of such parts turned over thereon.

The belt pulley 22 is contained within a housing which is desirably formed of a disk of sheet metal 33 with projections thereon forming legs 34 bent downwardly and secured to the frame 12. The disk has a central opening with sufficient diameter to allow the nut 31 to pass therethrough and this opening after the parts are assembled is partially filled by a split grooved ring 35 with its grooves receiving the edges of the disk opening. These sections of the split ring 35 are placed in position separately and then have a spring clip 36 sprung on them to hold them together, one end of the wire forming the spring clip being bent inwardly to space the ends of the ring sections apart, as shown in Fig. 2.

In operation a driving belt 37 from a gas engine or other motor passes around the driving pulley 22 and serves to drive the spindle, said driving pulley being firmly keyed on the spindle and having its key lugs 26 held securely within the recesses 27 by the clamping action of nut 31. When it is desired to disconnect the separator bowl, it may be done without disturbing the belt connection, for it is only necessary to loosen the nut 31 when the spindle may be lifted from the sleeve 23, leaving the driving pulley within its housing in its operative position and ready to receive the spindle again when the separator bowl is returned. At such time the lugs 26 are again entered in the recesses 27 and the nut 31 is turned onto the screw threads 32 of the spindle and the driving connection is complete and ready for operation.

By having the driving belt connection undisturbed at the time of removing the separator bowl there is no loss of time incident to the coupling and uncoupling of the driving connection of the spindle and the operation is greatly facilitated. By means of this construction also there is an even distribution of weight on the spindle which avoids a disturbance in the accurate balance thereof necessary for quiet running.

What I claim as new and desire to secure by Letters Patent, is:

1. A belt driving connection for removable centrifugal separator spindles, comprising a housing, a belt connected pulley loosely confined within the housing, a step bearing, and a separator spindle removably fitting within the step bearing and passing through the housing and having the pulley detachably mounted thereon.

2. In combination with a step bearing and a centrifugal separator spindle detachably mounted therein, a belt driving connection for the spindle adapted to remain in place to preserve the belt connection when the spindle is removed, comprising a fixed housing through which the spindle passes, and a belt connected pulley loosely confined within the housing and adapted to removably fit upon the spindle and be supported thereby.

3. In combination with a stationary step bearing, and a centrifugal separator spindle removably fitting therein, a belt driving connection for the spindle capable of remaining in place to preserve the belt connection while the spindle is removed, comprising a belt connected pulley, a housing surrounding the pulley to confine it in place when the spindle is removed, and means for detachably supporting the pulley on the spindle and coupling it thereto.

4. In combination with a stationary step bearing and a centrifugal separator spindle removably mounted therein, a belt driving connection for the spindle adapted to remain in place to preserve the belt connection when the spindle is removed, comprising a belt connected pulley, a housing around the pulley adapted to confine it in place, a sleeve on the pulley adapted to removably fit upon the spindle, a key projecting from the sleeve, there being a key seat on the spindle to receive the key, and a clamping nut threaded on the spindle and engaging the sleeve for drawing the sleeve and the spindle together in their key engagement.

5. A separator spindle driving connection, comprising the combination with a separator spindle provided with a keyseat, of a sleeve in which the spindle removably fits, a key on the sleeve fitting in the keyseat of the spindle, a belt pulley on the sleeve, a shouldered nut on the sleeve threaded on the spindle for holding the sleeve in engagement with the spindle, a housing containing the sleeve and the pulley and provided with an opening through which the nut may pass, a grooved split ring fitting within the opening of the housing around the sleeve, and a spring surrounding the split ring and having a bent end extending between the ends of the grooved split ring for forcing them apart to engage the groove of the ring with the edges of the opening, said housing serving to hold the sleeve and belt pulley in place when the spindle is removed.

6. A separator spindle driving connection, comprising the combination with a separator spindle provided with a keyseat, of a sleeve within which the spindle removably fits, a key on the sleeve engaging the keyseat of the spindle, said sleeve being provided with a shouldered reduced end, a ring fitting on the reduced end of the sleeve against the shoulder, the edge of the sleeve being turned over against said ring whereby the ring constitutes an outwardly extending flange of the sleeve, a nut threaded on the spindle and provided with an inwardly extending flange ring similar to the flange ring of the sleeve and engaged therewith, and a pulley on the sleeve.

7. In combination with a step bearing and a centrifugal separator spindle removably mounted therein, of a belt driving connection for the spindle adapted to remain in place to preserve the belt connection when the spindle is removed, comprising a belt connected pulley, a housing confining the pulley in place, a sleeve passing through the pulley and fixed thereto and adapted to removably fit on the spindle, a shoulder at the lower end of the sleeve engaging a shoulder on the spindle, a key projection on the upper end of the sleeve engaging a key seat on the spindle and a clamping nut having a swivel connection with the sleeve and threaded on the spindle for drawing the sleeve and spindle together in their key engagement.

In testimony whereof, I affix my signature, in presence of two witnesses.

CHARLES K. SALISBURY.

Witnesses:
 KATHERINE HOLT,
 R. S. C. CALDWELL.

Copies of this patent may be obtained for five cents each, by addressing the "Commissioner of Patents, Washington, D. C."